United States Patent
Yamaguchi et al.

(10) Patent No.: US 6,470,764 B1
(45) Date of Patent: Oct. 29, 2002

(54) ELECTRIC DRIVE DEVICE FOR TRANSMISSION

(75) Inventors: Mikio Yamaguchi, Takasaki (JP); Ryohei Yamauchi, Gunma-ken (JP); Daisaku Kawada, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/868,589
(22) PCT Filed: Oct. 27, 2000
(86) PCT No.: PCT/JP00/07595
  § 371 (c)(1),
  (2), (4) Date: Jun. 20, 2001
(87) PCT Pub. No.: WO01/31234
  PCT Pub. Date: May 3, 2001

(30) Foreign Application Priority Data

Oct. 27, 1999 (JP) .......................... 11-304984
Oct. 27, 1999 (JP) .......................... 11-304985

(51) Int. Cl.⁷ .............................. F16H 63/30
(52) U.S. Cl. ..................... 74/335; 74/473.12
(58) Field of Search ............. 74/335, 473.12, 74/473.25

(56) References Cited

U.S. PATENT DOCUMENTS

| | | | | |
|---|---|---|---|---|
| 2,821,089 A | * | 1/1958 | Russel ................... 74/335 |
| 4,567,969 A | * | 2/1986 | Makita .................. 74/473.12 |
| 5,150,629 A | * | 9/1992 | Morris et al. ........... 74/473.12 |
| 5,205,179 A | * | 4/1993 | Schneider ................. 74/335 |
| 5,219,391 A | * | 6/1993 | Edelen et al. ............. 74/335 |
| 5,832,777 A | * | 11/1998 | Weilant ................... 74/335 |
| 6,321,612 B1 | * | 11/2001 | Leimbach et al. ........ 74/473.12 |

FOREIGN PATENT DOCUMENTS

| | | |
|---|---|---|
| JP | 2271164 | 7/1990 |
| JP | 5256362 | 6/1993 |
| JP | 6145094 | 5/1994 |
| JP | 7501131 | 4/1996 |
| JP | 8322189 | 12/1996 |
| JP | 2878881 | 1/1999 |
| JP | 2992697 | 10/1999 |
| JP | 200035128 | 2/2000 |

* cited by examiner

Primary Examiner—Sherry Estremsky
(74) Attorney, Agent, or Firm—Crowell & Moring LLP (57) ABSTRACT

An electric driving device for a transmission can be reduced in size with a simple structure, and can be installed in a small-sized car, such as a passenger car. In this electric driving device, a shift shaft 2 effects a selecting operation by its displacement in the axial direction and a shifting operation by its rotation. The displacement of the shift shaft 2 in the axial direction is effected by rocking and displacing a rocking arm 18 by means of a first actuator 13 or 113. Rotation of the shift shaft 2 is effected by pushing and/or pulling a rocking arm 20 by means of a second actuator 21. This driving arm 20 is fixedly disposed on the outer peripheral surface of a spline tube 5 which is brought into spline-engagement with the shift shaft 2.

7 Claims, 7 Drawing Sheets

ELECTRIC DRIVE DEVICE FOR TRANSMISSION

TECHNICAL FIELD

The present invention relates to an electric driving device for a transmission. An electric driving device for a transmission according to the present invention is suited to be utilized as a driving device for changing a gear ratio of a transmission of a car automatically or under an instruction from the driver.

RELATED BACKGROUND

Hitherto, as a transmission of a car, there is widely employed a manual transmission with which the driver changes gears by operating a shift lever, together with a clutch pedal, or an automatic transmission for automatically changing gears in accordance with a situation. Out of these types, for an automatic transmission, a combination of a torque converter and a planetary gear mechanism, a combination of a variable-type pulley and an endless belt, and the like, are conventionally used. Furthermore, a transmission for a car which allows automatic switching of a gear unit conventionally serving as a manual transmission and automatic disconnection of the clutch is recently used since it is easily to operate and has a higher efficiency in transmission, compared with an ordinary automatic transmission. As a structure for changing the gears constituting a gear unit in such an automatic transmission, there are conventionally known a hydraulic type and a mechanical type as disclosed in Japanese Patent Application Laid-Open No. 2-273051.

In a structure in which hydraulic is used to change the gears for constituting a gear unit, like in the conventional structure, a power loss is generated since a hydraulic pump is driven to rotate all the time during the drive of a car, which not only exercises a bad influence on the running performance or the cost performance of the car, but also requires extra works for preventing a fault which may be caused by oil leakage. A device which is conventionally known for mechanically performing the above switching has been developed for large-sized vehicles such as a tractor, so as to have a complicated arrangement and require a wider space to be installed, which is unsuitable for small-sized vehicles like a passenger car.

An electric driving device for a transmission of the present invention has been contrived taking such circumstances into consideration.

DISCLOSURE OF THE INVENTION

According to a first aspect of the present invention, there is provided an electric driving device for a transmission which is characterized in that:

a selecting operation for displacing a shift shaft in the axial direction so as to select a desirable gear out of a plurality of gears and a shifting operation for rotating the shift shaft so as to bring the selected gear into a meshing state are performed by a first and second actuators respectively employing electric motors as the driving sources thereof;

the first actuator for performing the selecting operation comprises a first electric motor, a worm gear to be driven to rotate by an output shaft of this first electric motor, a worm wheel to be meshed with this worm gear, and a rocking arm for rotating together with this worm wheel, the tip end of this rocking arm being engaged with a part of the shift shaft to allow this shift shaft to be displaceable in the axial direction upon rocking of this rocking arm;

the second actuator for performing the shifting operation comprises a second electric motor, and a ball screw mechanism equipped with an output shaft member to be driven to rotate by an output shaft of this second electric motor for issuing an output converted into a rectilinear motion; and the tip end of this output shaft member is coupled to the tip end of a driving arm for rotating the shift shaft so that the driving arm is rotated by the rectilinear motion of the output member to rotate the shift shaft, thereby performing the shifting operation.

According to a second aspect of the present invention, there is provided an electric driving device for a transmission which is characterized in that:

a selecting operation for displacing a shift shaft in the axial direction so as to select a desirable gear out of a plurality of gears and a shifting operation for rotating the shift shaft so as to bring the selected gear into a meshing state are performed by a first and second actuators respectively employing electric motors as the driving sources thereof;

the first actuator for performing the selecting operation comprises a first electric motor, a rotation transmitting member to be driven to rotate by an output shaft of this first electric motor and having peripheral teeth, a rotation receiving member having peripheral teeth substantially in parallel to the shaft of the rotation transmitting member to be meshed with the peripheral teeth of the rotation transmitting member, and a rocking arm for rotating together with this rotation receiving member, the tip end of this rocking arm being engaged with a part of the shift shaft to allow this shift shaft to be displaceable in the axial direction upon rocking of this rocking arm;

the second actuator for performing the shifting operation comprises a second electric motor, and a ball screw mechanism equipped with an output shaft member to be driven to rotate by an output shaft of this second electric motor for issuing an output converted into a rectilinear motion; and the tip end of this output shaft member is coupled to the tip end of a driving arm for rotating the shift shaft so that the driving arm is rotated by the rectilinear motion of the output member to rotate the shift shaft, thereby performing the shifting operation.

According to a third aspect of the present invention, the electric driving device for a transmission according to the first and second aspects is characterized in that:

the ball screw mechanism comprises a ball screw shaft to be driven to rotate by the second electric motor, and the output shaft member disposed around this ball screw shaft for moving in the axial direction of the ball screw shaft upon rotation of the ball screw shaft.

According to a fourth aspect of the present invention, the electric driving device for a transmission according to the first and second aspects is characterized in that:

the ball screw mechanism comprises a ball nut to be driven to rotate by the second electric motor, and a ball screw shaft to be engaged with this ball nut through a ball for moving in the axial direction upon rotation of the ball nut; and the ball screw shaft serves as the output shaft member.

According to a fifth aspect of the present invention, there is provided an electric driving device which is used for a transmission for performing a selecting operation for displacing a shift shaft in the axial direction so as to select a desirable gear to bring it into a meshing state and a shifting operation for rotating the shift shaft so as to bring the selected gear into a meshing state, comprising:

an electric motor;

a ball screw mechanism having an output shaft member for converting a rotation output of the electric motor into a rectilinear motion and outputting this rectilinear motion, the output shaft member arranged to be coupled to a rocking driving arm of the shift shaft to rotate the shift shaft; and a detent mechanism for locating the output shaft member at a neutral position so as to give a predetermined resistance when the output shaft member is moved from the neutral position.

The electric driving device for a transmission of the present invention arranged as described above switches the gears of a gear unit in the following manner. First, the first electric motor for constituting the first actuator is rotated in a predetermined direction to rock and displace the rocking arm. Then, the shift shaft is displaced in the axial direction along a predetermined direction from the tip end of this rocking arm, so as to perform the selecting operation. Since the power required for this selecting operation is small, even when a displacing speed of the rocking arm is secured by meshing the worm gear with the worm wheel, or by meshing the rotation transmitting member with the rotation receiving member (both members are respectively disposed substantially in parallel to each other and provided with the peripheral teeth), the selecting operation can be satisfactorily performed without using a motor capable of a particularly large output as the first electric motor.

After the selecting operation is thus performed, the shift shaft is rotated by the second actuator through the driving arm in order to perform the shifting operation. Though this shift operation is performed by moving the output shaft member of the ball screw mechanism for constituting the second actuator in the axial direction through this ball screw mechanism, the power for thus moving the output shaft member in the axial direction through the ball screw mechanism can be made satisfactorily large. As a result, the shifting operation which requires a larger power, compared with the selecting operation, can be performed without fail.

The meshing state between the worm gear and the worm wheel or that between the rotation transmitting member and the rotation receiving member for constituting the first actuator is arranged to be reversible, and the engaging state with the ball screw mechanism for constituting the second actuator is also reversible. Accordingly, even when the drive of the shift shaft can not be performed by these first and second electric motors due to a fault of these first and second electric motors, it is possible to drive this shift shaft manually.

DETAILED DESCRIPTION OF THE PREFERRED EMBODIMENTS

FIGS. 1 to 4 illustrate a first embodiment of the present invention. From a side surface of a mission case 1 which incorporates therein a gear unit similar to a manual transmission, the tip end 3 of the shift shaft 2 for changing a gear ratio of this gear unit is protruded. In a middle portion of this tip end 3, a male spline portion 4 is formed, and a spline tube 5 with a female spline formed on the inner peripheral surface thereof is brought into spline-engagement with this male spline portion 4.

In the present embodiment, between the inner peripheral surface of a middle portion of a support tube 7 which is fixed to the periphery of an opening 6 of the mission case 1 and the outer peripheral surface of the base portion (the lower portion in FIG. 2) of the spline tube 5, there is provided a rolling bearing 8 such as a deep groove type ball bearing, which can support a load in both the radial direction and the thrust direction, thereby supporting the spline tube 5 to allow rotation only thereof. Also, a seal ring 9 is provided between the inner peripheral surface of the tip end (the upper end portion in FIG. 2) of the support tube 7 and the outer peripheral surface of the middle portion of the spline tube 5 so as to seal the end portion of the opening of the support tube 7. Furthermore, an engagement piece 10 is engaged with a portion which is protruded from the spline tube 5 at a portion further ahead of the tip end 3. This engagement piece 10 has a U-shaped cross section and is formed in an annular shape as a whole, with an engagement groove 11 extending along the entire outer peripheral surface thereof. An extendable bellow 12 is laid between the outer peripheral surface of the tip end (the upper end portion in FIG. 2) of the spline tube 5 and the outer peripheral surface of the portion further ahead of the tip end 3 so as to prevent foreign substances from advancing into the spline engagement portion between the spline tube 5 and the shift shaft 2.

Figure 5:
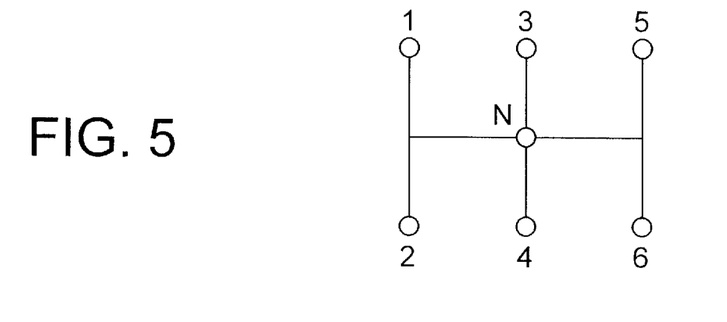
FIG. 5 is a schematic plan view for showing a shift pattern of a transmitter.

The shift shaft 2 to which the spline tube 5 and the engagement piece 10 are attached as described above causes a selecting operation (an operation for selecting a gear for changing a speed by displacing a shift lever in the widthwise direction of the vehicles in an ordinary floor shift car of a manual transmission type) with its displacement in the axial direction (the obverse-reverse direction of the sheet in FIG. 1 and the up-and-down direction in FIG. 2) and a shifting operation (an operation for coupling a synchro-mesh mechanism corresponding to the selected gear by. displacing the shift lever in the longitudinal direction of the vehicles) with its rotation, respectively. For instance, as shown in FIG. 5, in case of a gear unit for realizing six speed transmission, including five forward (first to fifth speed levels) and one backward (R), three positions including the both end positions in the lateral direction and the central position in the lateral direction in FIG. 5 are selected by the selecting operation while maintaining the neutral state in which no gear change occurs (the synchro-mesh mechanism is in a free state). With the shifting operation, the gear is shifted from the three positions in this neutral state into either direction (upward or downward direction in FIG. 5) to make either of the synchro-mesh mechanisms in the connected state, thereby causing either of the gear states. For displacing the shift shaft 2 in the axial direction in order to effect the selecting operation out of these two operations, a first actuator 13 is provided between the outer peripheral surface of the mission case 1 and the engagement piece 10.

Figure 3:
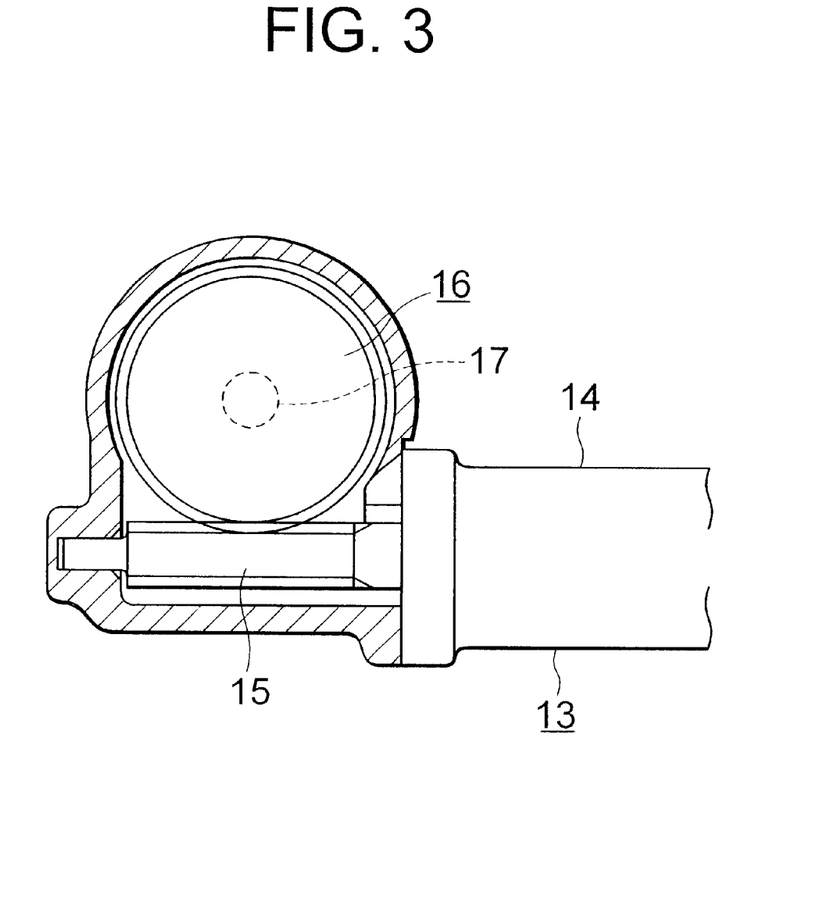
FIG. 3 is a cross-sectional view taken along the line B—B in FIG. 1.

This first actuator 13 drives to rotate a multiple thread worm gear 15 by means of an output shaft of a first electric motor 14 which is rotatable both in the forward and reversal directions, such as a reduction motor, as shown in FIG. 3. A lead angle of this multiple thread worm gear 15 is made large to be around 15° to 25°. Then, this multiple thread worm gear 15 is brought to be meshed with the worm wheel 16. The output shaft 17 serving as the center of rotation of this worm wheel 16 is located at a twisted position with respect to the multiple thread worm gear 15. Then, it is arranged such that the base end portion of a rocking arm 18 is coupled and fixed to this output shaft 17 so that this rocking arm 18 is rotated together with the worm wheel 16. An engagement convex portion 19 which is formed on a lateral surface at the tip end of this rocking arm 18 (the upper surface of the left end portion in FIG. 1) is brought into engagement with a engagement groove 11 of the engagement piece 10. With this arrangement, the shift shaft 2 becomes displaceable in the axial direction upon rocking of the rocking arm 18 around the output shaft 17.

Figure 4:
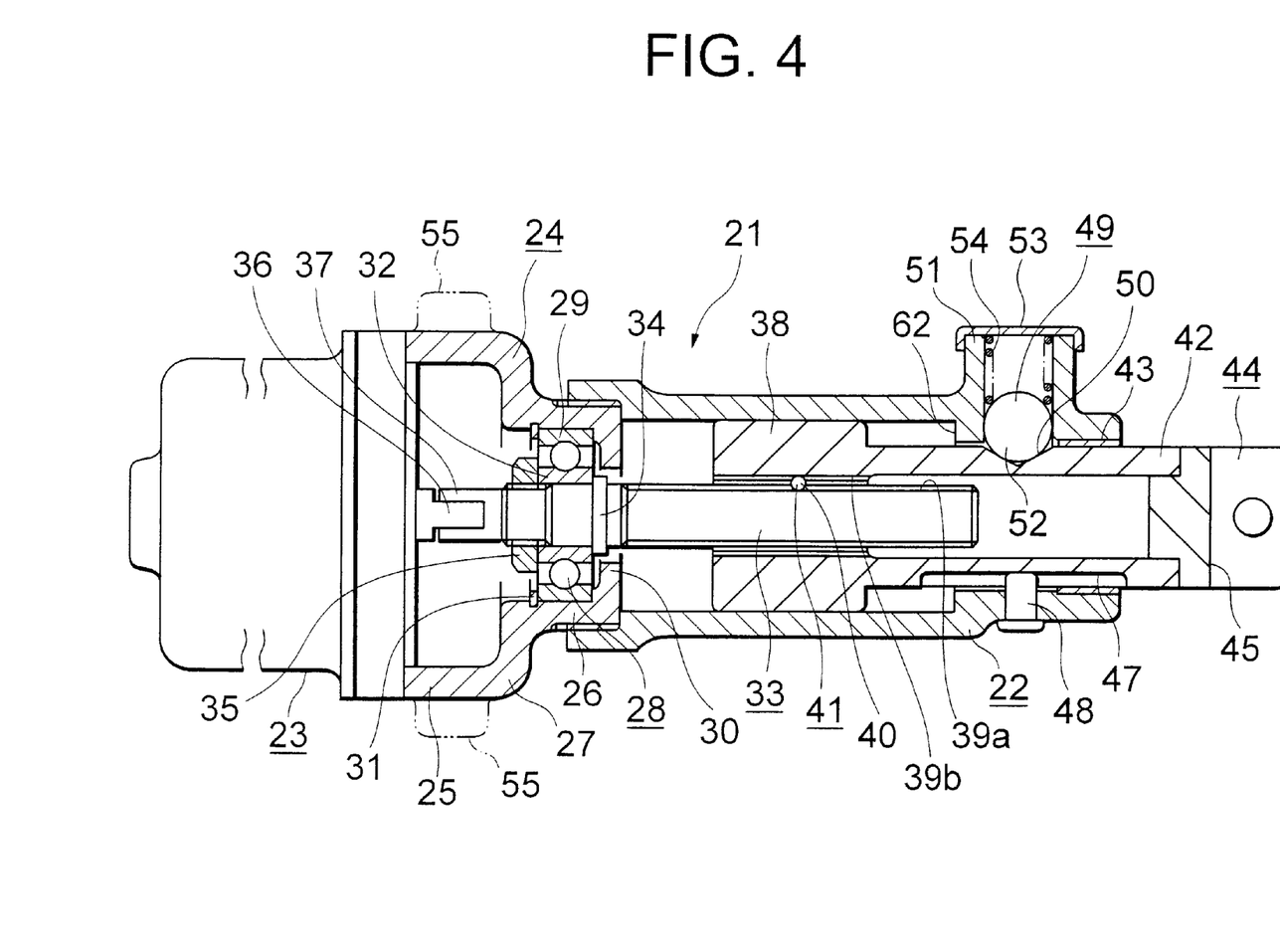
FIG. 4 is a cross-sectional view taken along the line C—C in FIG. 1.

On the other hand, in order to rotate the shift shaft 2 for effecting the shifting operation, a second actuator 21 is provided between the outer surface of the mission case 1 and the tip end portion of a driving arm 20 which is fixedly provided on the outer peripheral surface of the spline tube 5. This second actuator 21 is, as shown in FIG. 4, supports and fixes through a tube-like motor housing 24 a second electric motor 23 which is capable of forward and reversal rotation to an end portion (the left end portion in FIG. 4) of a housing 22 in a substantially cylindrical form. This motor housing 24 is comprised of a large diameter portion 25 and a small diameter portion 26 coupled together by a step portion 27 therebetween. Out of these portions, the small diameter portion 26 is threadably fixed to an end portion of the housing 22, while the second electric motor 23 is fixedly supported by the large diameter portion 25.

Inside the small diameter portion 26, a part closer to the base end of a middle portion of a ball screw shaft 33 is supported only to be rotatable by means of a rolling bearing 28 capable of supporting a radial load and a thrust load, such as a ball bearing of a deep groove type. It is noted that an outer race 29 for constituting this rolling bearing 28 is sandwiched by and between the inner surface of a flange portion 30 which is formed inward at the opening end of the small diameter portion 26 and a stop ring 31 which is latched by the inner peripheral surface of a middle portion of this small diameter portion 26, so as to prevent the displacement thereof in the axial direction. An inner race 32 for constituting the rolling bearing 28 is sandwiched by and between a flange portion 34 which is formed outward in a middle portion of the ball screw shaft 33 and a nut 35 which is threadably attached to the outer peripheral surface of the base end portion of this ball screw shaft 33 (the left end portion in FIG. 4), so as to prevent the displacement of the inner race 32 in the axial direction with respect to this ball screw shaft 33. Then, a portion at the base end portion of the ball screw shaft 33 which is more protruded than the rolling bearing 28 and an output shaft 36 of the second electric motor 23 are coupled to each other by means of a coupling portion 37 to allow transmission of a rotating force.

A ball nut 38 is disposed around the ball screw shaft 33. Then, a plurality of balls 40 are disposed between ball screw grooves 39a and 39b which are respectively formed on the outer peripheral surface of the ball screw shaft 33 and the inner peripheral surface of the ball nut 38, so as to constitute a ball screw mechanism 41. Since being prevented from revolving itself as described later, the ball nut 38 is displaced in the axial direction of the ball screw shaft 33 upon revolution of the ball screw shaft 33. The base end portion of an output shaft member 42 in a cylindrical form is coupled to one end surface (the right end surface in FIG. 4) of this ball nut 38, by forming this ball nut 38 integrally with the output shaft member 42.

The outer peripheral surface of a middle portion of the output shaft member 42 is brought into sliding contact with a sliding bearing 43 which is latched on the inner peripheral surface of the front end portion (the right end portion in FIG. 4) of the housing 22 so as to guide the output shaft member 42. A coupling bracket 44 is fixed to the tip end portion of this output shaft member 42 so that this output shaft member 42 and the tip end portion of the driving arm 20 can be coupled to each other. The coupling bracket 44 is formed in a forked shape with a notch 45 into which the tip end portion of the driving arm 20 can be inserted. Thus, in a state that the tip end portion of this driving arm 20 is inserted in the notch 45, the driving arm 20 and the coupling bracket 44 is rockably and displaceably coupled to each other by a coupling pin 46.

In the illustrated embodiment, a guide groove 47 is formed on the outer peripheral surface of the middle portion of the output shaft member 42 along the axial direction (the lateral direction in FIG. 4) of this output shaft member 42. Then, a guide pin 48 which is fixed to the tip end portion of the housing 22 is brought into engagement with the guide groove 47, so as to constitute rotation preventing means for preventing a rotation of the output member 42 and the ball nut 38.

The inner end surface (the right end surface in FIG. 4) of the motor housing 24 is disposed to face one side surface (the left end surface) in the axial direction of the ball nut 38, and a step portion 62 which is formed on a part closer to the tip end portion of the inner peripheral surface of the housing 22 is to,face the other end surface (the right end surface in FIG. 17) in the axial direction of the ball nut 38, respectively, so as to constitute stopper means for controlling an amount of displacement with respect to the axial direction of the ball nut 38.

Furthermore, between the output shaft member 42 and the housing 22, there is formed a detent mechanism 49 which is engaged at a middle position of a stroke of the ball nut 38 which is controlled by the stopper means, so as to generate a resistance against the displacement of this ball nut 38 in the axial direction. In order to constitute this detent mechanism 49, there is provided a concave hole 50 in the form of a conical bowl which has a deeper portion toward the central part on the bottom at a position on the opposite side to the guide groove 47 in the radial direction on the outer peripheral surface of the middle portion of the output shaft member 42. In addition, a cylinder portion 51 is disposed along the radial direction of the housing 22 and the ball nut 38 in a portion which is part of the housing 22 and is opposite to the concave hole 50 to follow the displacement of the ball nut 38 in the axial direction. Then, inside the cylinder portion 51, a ball 52 made of steel, or the like, is retained to be displaceable in the radial direction. Between the ball 52 and a cap 53 attached to the opening end of the cylinder portion 51, there is disposed a compression coil spring 54 serving as an elastic member so as to elastically press the ball 52 against the outer peripheral surface of the output shaft member 42.

The arrangement of the detent mechanism is not limited to that described above, but may be such an arrangement in which an elastic ring is engaged with a tapered groove formed on the periphery of the output shaft member 42, an arrangement in which a convex member formed outside a concave portion formed on the periphery of the output shaft member 42 is brought into pressure contact and engagement with this concave portion by the elasticity thereof, or an arrangement in which a member with a notch portion formed around a tapered convex portion which is formed on the periphery of the output shaft member 42 is brought into engagement with this tapered convex portion by the elasticity thereof. In other words, any arrangement may be employed so long as the output shaft member 42 is located in a middle position of the stroke thereof so as to give a predetermined resistance against a movement from that position in that arrangement.

The second actuator 21 arranged as described above supports mount portions 55, 55 which are disposed at two positions on the sides opposite to each other in the radial direction on the outer peripheral surface of the motor housing 24 to be rockable on a support bracket 56 disposed on the outer surface of the mission case 1 by means of a pair of pivots which are concentric with each other. As described above, the tip end portion of the output shaft member 42 and the driving arm 20 are coupled to each other through the coupling bracket 44 and the coupling pin 46.

In the ball screw mechanism 41 of the second actuator 21 described above, the ball screw shaft 33 is coupled to the motor output shaft 36 to be rotated, and the ball nut 38 is formed integrally with the output shaft member 42 to effect rectilinear motion. However, contrary to this arrangement, the arrangement may be such that the ball screw shaft which is engaged with the ball nut through the ball is formed integrally with the output shaft member 42 to effect straight advancement.

In the electric driving device for a transmission of the present invention arranged as described above, gears of a gear unit built in the mission case 1 are switched over in the following manner. First, the first electric motor 14 for constituting the first actuator 13 is rotated in a predetermined direction so as to rock and displace the rocking arm 18 in the up-and-down (vertical) direction in FIG. 2. Then, the shift shaft 2 is displaced in the axial direction along a predetermined direction through the engagement piece 10 by means of an engagement protrusion 19 which is disposed at the tip end portion of the rocking arm 18, thereby effecting the selecting operation. Since the power required for this selecting operation is small, even when the multiple thread worm gear 15 and the worm wheel 16 are meshed with each other to secure a displacing speed of the rocking arm 18, the selecting operation can be effected satisfactorily without employing a motor having an especially large output as the first electric motor 14. As a result, both the reduction in size of the device and the speed-up of the selecting operation can be easily attained. It is noted that, when this selecting operation is to be performed, the movement to the both end positions is effected by rotating the first electric motor 14 in a predetermined direction until the shift shaft 2 ceases to displace. On the contrary, the movement to the central position is effected by rotating the first electric motor 14 only for a predetermined time from the state in which the shift shaft 2 is present in either of the end portions.

After the selecting operation is thus effected, the second actuator 21 is extended or reduced so as to perform the shifting operation, whereby the shift shaft 2 is rotated in a predetermined direction through the driving arm 20. When the shifting operation is to be thus effected, the ball screw shaft 33 is rotated in a predetermined direction by means of the second electric motor 23. Then, the ball nut 38 and the output shaft member 42 are displaced by the ball screw mechanism 41 to push and/or pull the driving arm 20. The shifting operation is effected to realize an arbitrary gear state at the both end positions of the extendable stroke of the second actuator 21 (to set a synchro-mesh mechanism corresponding to the desired gear in a connected state). As described above, the both end positions of the stroke of the ball nut 38 and the output shaft member 42 are restricted by collision between the both end surfaces in the axial direction of this ball nut 38 and the inner end surface of the motor housing 24 or the step portion 62. Accordingly, in the illustrated embodiment, at the both end positions of the stroke, the ball nut 38 and the output shaft member 42 can be positioned by detecting an increase in the electric current running into the second electric motor 23 to stop energization to the second electric motor 23. The shifting operation as described above is performed by rotating the ball screw shaft 33 to move the ball nut 38 in the axial direction. In this case, the power for moving the ball nut 38 in the axial direction in this manner can be set satisfactorily large. As a result, the shifting operation requiring a larger power than the selecting-operation can be performed securely.

On the other hand, in order to change a gear ratio, the second actuator 23 is displaced from one end side of the extendable stroke (for instance, in the maximum extension state) to the other end side (for instance, in the maximum reduction state) (when the rectilinear shifting operation is effected in the vertical direction in FIG. 5). Or, after the selecting operation is once gone through, the shifting operation is performed for the second time. In case that the selecting operation is once gone through in this manner, the second actuator 21 is once halted at the central position of the extendable stroke so as to enable the above-described selecting operation. The above-described neutral state for thus enabling the selecting operation is corresponding to the central position of the extendable stroke. In addition, at this central position of the stroke, the detent mechanism 49 described above is started. Specifically, in this embodiment, the ball 52 and the concave hole 50 for constituting the detent mechanism 49 are brought into engagement with each other at the central position of the stroke, thereby generating a resistance against the displacement of the output shaft member 42. Accordingly, in the illustrated embodiment, the central position can be correctly located when the ball nut 38 energizes the second electric motor 23 for a predetermined time from a state in which it is positioned in either end portion and the concave hole 50 displaces the output shaft member 42 to a position to face the ball 52. It is noted that the detent mechanism 49 can be omitted if the second actuator 21 can be halted at the central position of the stroke by detecting or regulating an amount of rotation of the second electric motor 23.

As describe above, according to the electric driving device for a transmission of the present invention, it is possible to perform change of the gear ratio by driving the shift shaft 2 which serves as the input member of the gear unit without employing such a mechanism as requiring an extra work and space for installation thereof. Moreover, the meshing state between the multiple thread worm gear 15 and the worm wheel 16 for constituting the first actuator 13 is reversible, and the engaging state between the ball screw shaft 33 and the ball nut 38 for constituting the second actuator 21 is also reversible. Accordingly, even when the drive of the shift shaft 2 becomes disabled by these first and second electric motors 14 and 23 due to a fault of the first electric motor 14 or of the second electric motor 23, it becomes possible to drive this shift shaft 2 manually.

It is noted that, in the illustrated example, the detent mechanism 49 is disposed only at one position in a middle part of the stroke. However, if the detent mechanism is to be installed, when there are four or more positions, including the both end positions, are required for providing and positioning the detent mechanism, the detent mechanism may be disposed at two or more positions different from each other in the axial direction. In this case, it is possible to prevent mutual interference between the constituent parts (including, for instance, the cylinder portion 51) of the detent mechanism disposed close to each other in the axial direction by displacing the positions at which the respective detent mechanisms are disposed from each other not only in the axial direction, but also in the circumferential direction.

Figure 6:
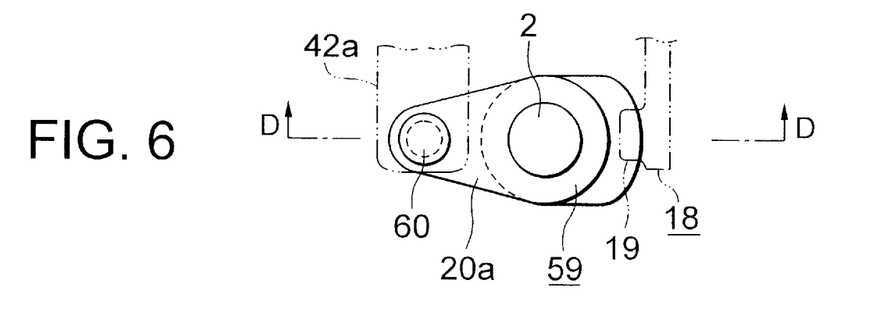
FIG. 6 is a partial plan view for showing a second embodiment of the present invention.
Figure 7:
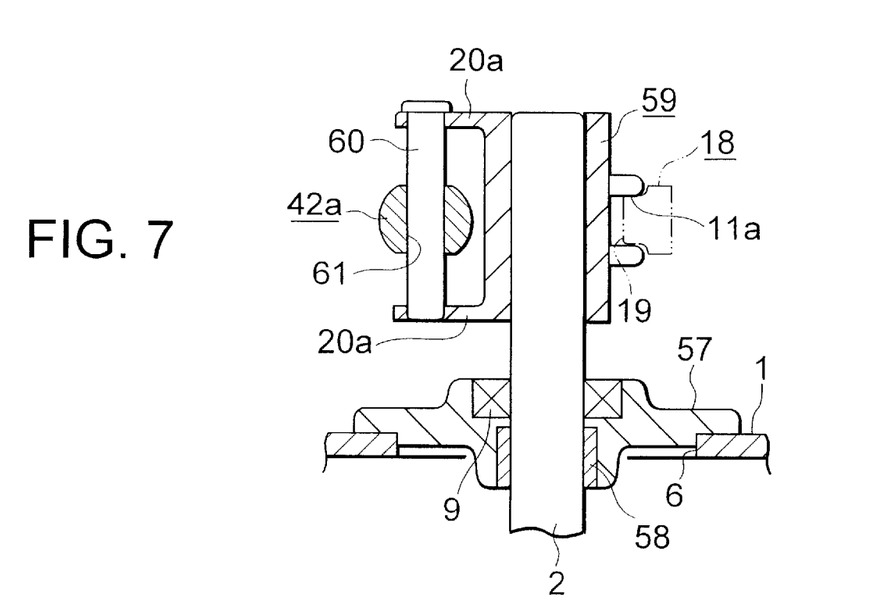
FIG. 7 is a cross-sectional view taken along the line D—D in FIG. 6.

Next, FIGS. 6 and 7 show a second embodiment of the present invention. In case of the present embodiment, the shift shaft 2 is supported to be rotatable by a sliding bearing 58 inside an annular support plate 57 which is fixed to an opening portion 6 of the mission case 1. A gap between the inner peripheral surface of the support plate 57 and the outer peripheral surface of the shift shaft 2 is sealed by the seal ring 9. A driving bracket 59 is fixed to a portion which is protruded from the mission case 1 at the tip end portion of the shift shaft 2 (the upper end portion in FIG. 7) in such a manner that a rotation thereof with respect to the shift shaft 2 or a displacement thereof along the axial direction is disabled.

An engagement groove 11a is formed on one side of the outer peripheral surfaces (the right side in FIGS. 6 and 7) of the driving bracket 59, and an engagement protrusion 19 which is disposed on one side (the left side in FIGS. 6 and 7) of the tip end portion of the rocking arm 18 to be rocked and displaced by the first actuator 13 (see FIGS. 1 to 3) is engaged with this engagement groove 11a. A slide pin 60 is supported in parallel to the shift shaft 2 between the tip end portions of a pair of driving arms 20a, 20a which are formed in the both end portions in the axial direction on the other side of the outer peripheral surfaces (the left one in FIGS. 6 and 7) of the driving bracket 59. Then, this slide pin 60 is inserted to be rockable and displaceable in the axial direction in a circular hole 61 which is formed at the tip end portion of an output shaft member 42a of the second actuator 21 (see FIGS. 1, 2 and 4).

Also, in case of the present embodiment arranged as described above, like in case of the foregoing first embodiment, the selecting operation can be effected by rocking the rocking arm 18 to displace the shift shaft 2 in the axial direction. Moreover, the shafting operation can be effected by displacing the output shaft member 42a in the axial direction.

Next, a modification 113 of the first actuator will be described with reference to FIGS. 8 and 9.

Figure 8:
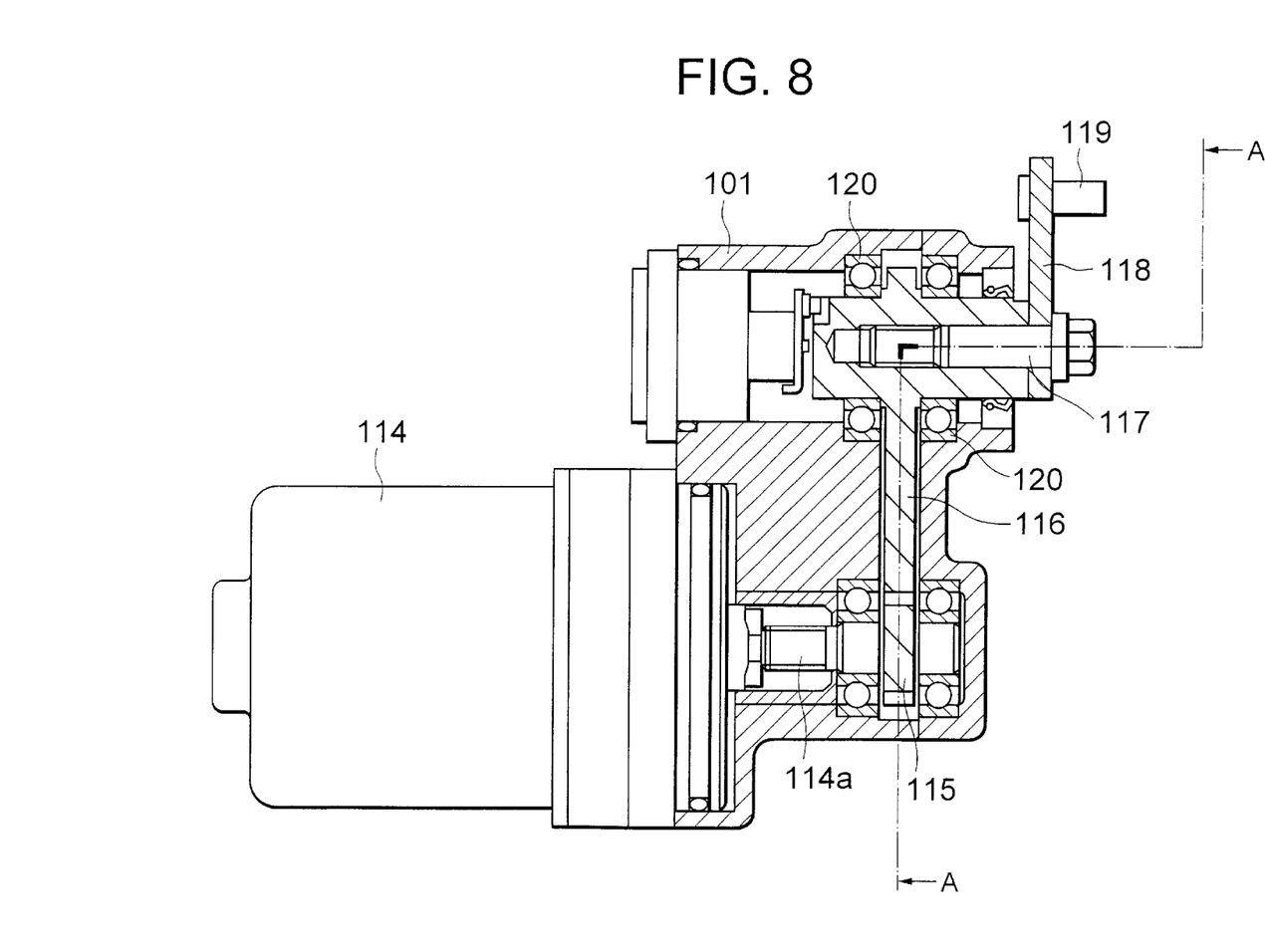
FIG. 8 is a partial plan view for explaining a variation of a first actuator.

This modification 113 of the first actuator has a disk gear 115 integrally with the output shaft 114a of a first electric motor 114 which is capable of forward and reversal rotation, such as a reduction motor, as shown in FIG. 8. A sector gear 116 is meshed with the disk gear 115. The disk gear 115 has the rotary shaft which is substantially parallel to the rotary shaft of the sector gear 116. The term "substantially parallel" in this case includes not only a case of a complete parallel relationship, but also a case having a slight inclination of about ±15°.

Figure 1:
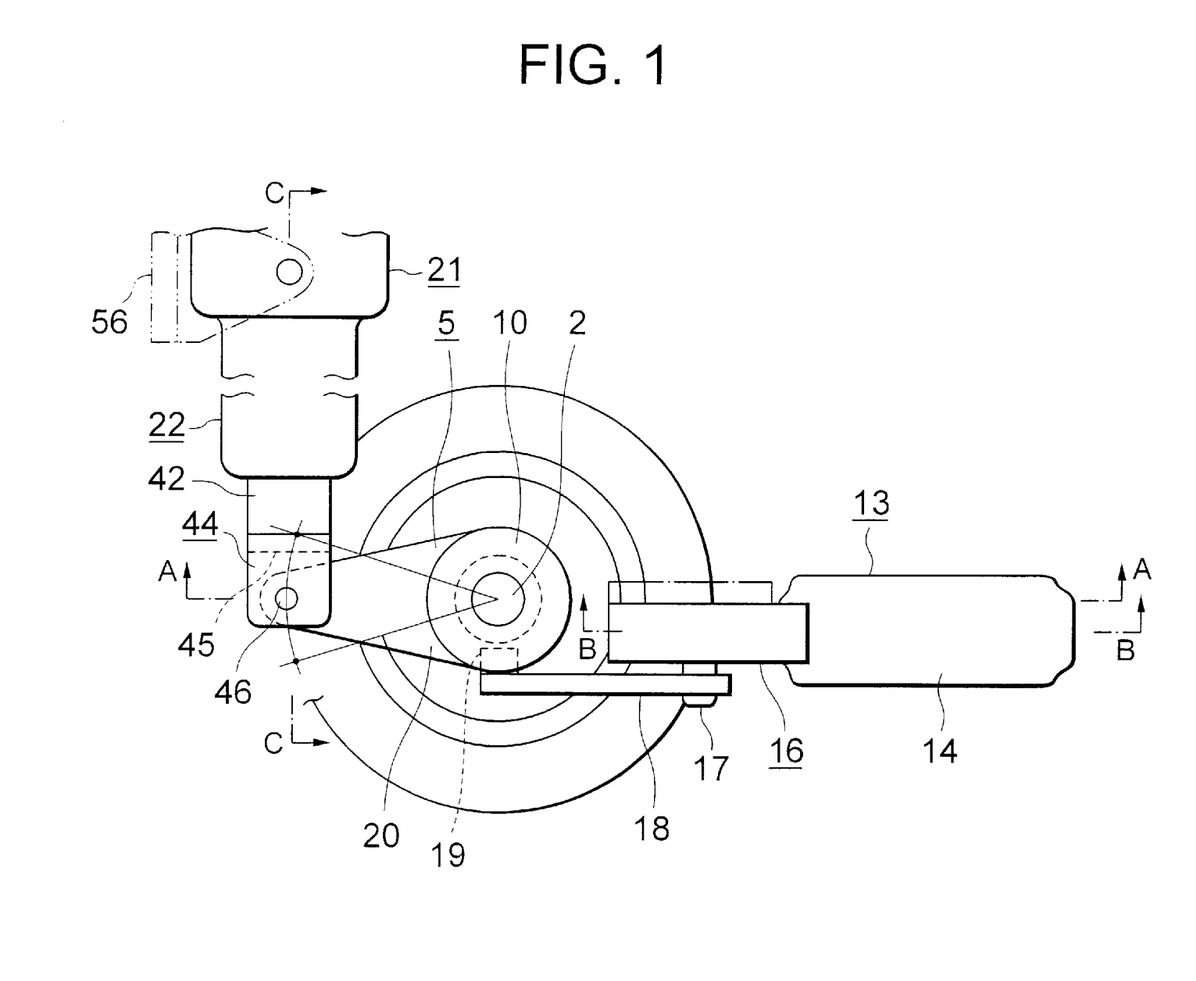
FIG. 1 is a plan view for showing a first embodiment of the present invention.
Figure 2:
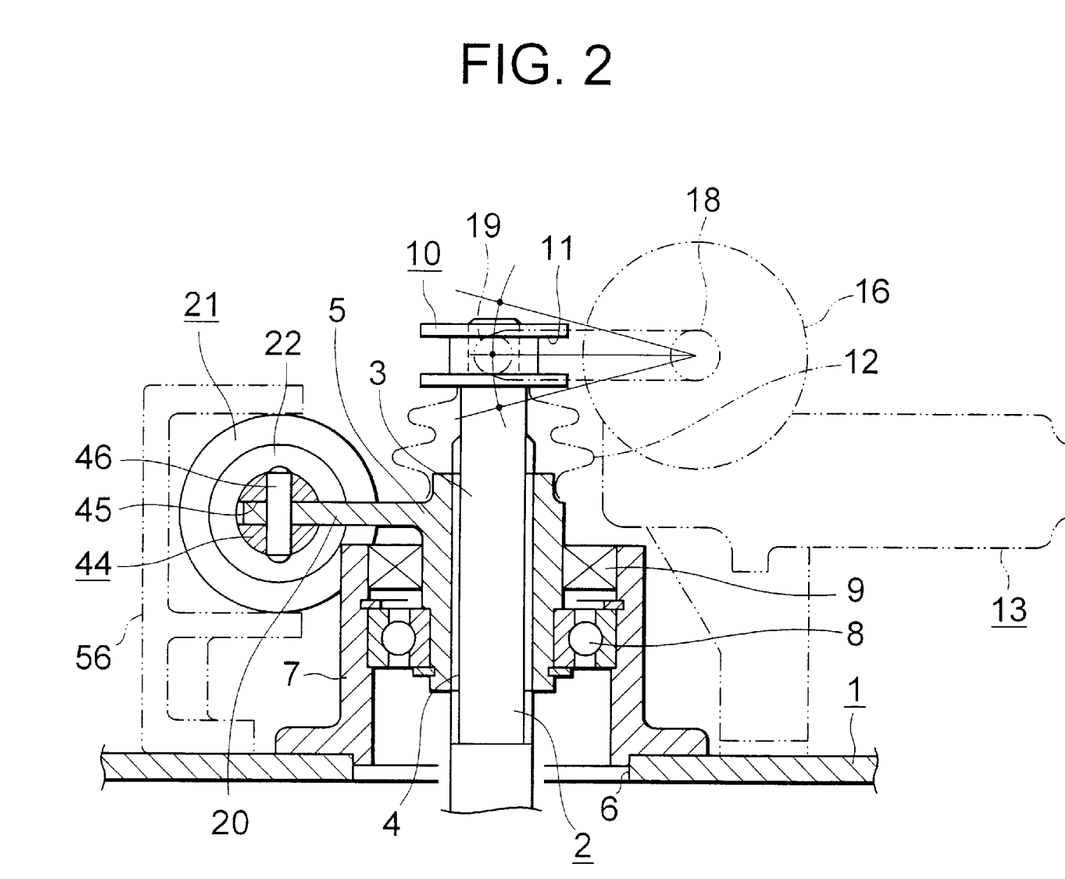
FIG. 2 is a cross-sectional view taken along the line A—A in FIG. 1.

The sector gear 116 is supported to be rotatable by the housing 101 through ball bearings 120. The housing 101 is formed integrally with a motor housing and is integral with a transmission case 1 (FIG. 2). The base end portion of the rocking arm 118 is coupled and fixed to the output shaft 117 which servers as the center of rotation of the sector gear 116, and this rocking arm 118 is arranged to rotate together with the sector gear 118. The tip end portion of this rocking arm 118 is engaged with the engagement groove 11 of the engagement piece 10 which is shown in FIG. 2 through the engagement convex portion 119, in the same manner as the tip end portion of the rocking arm 18 of the first actuator 13 which is shown in FIG. 2. With this structure, the shift shaft 2 shown in FIG. 2 is arranged to be displaceable in the axial direction to follow the rocking of the rocking arm 118 around the output shaft 117.

Figure 9:
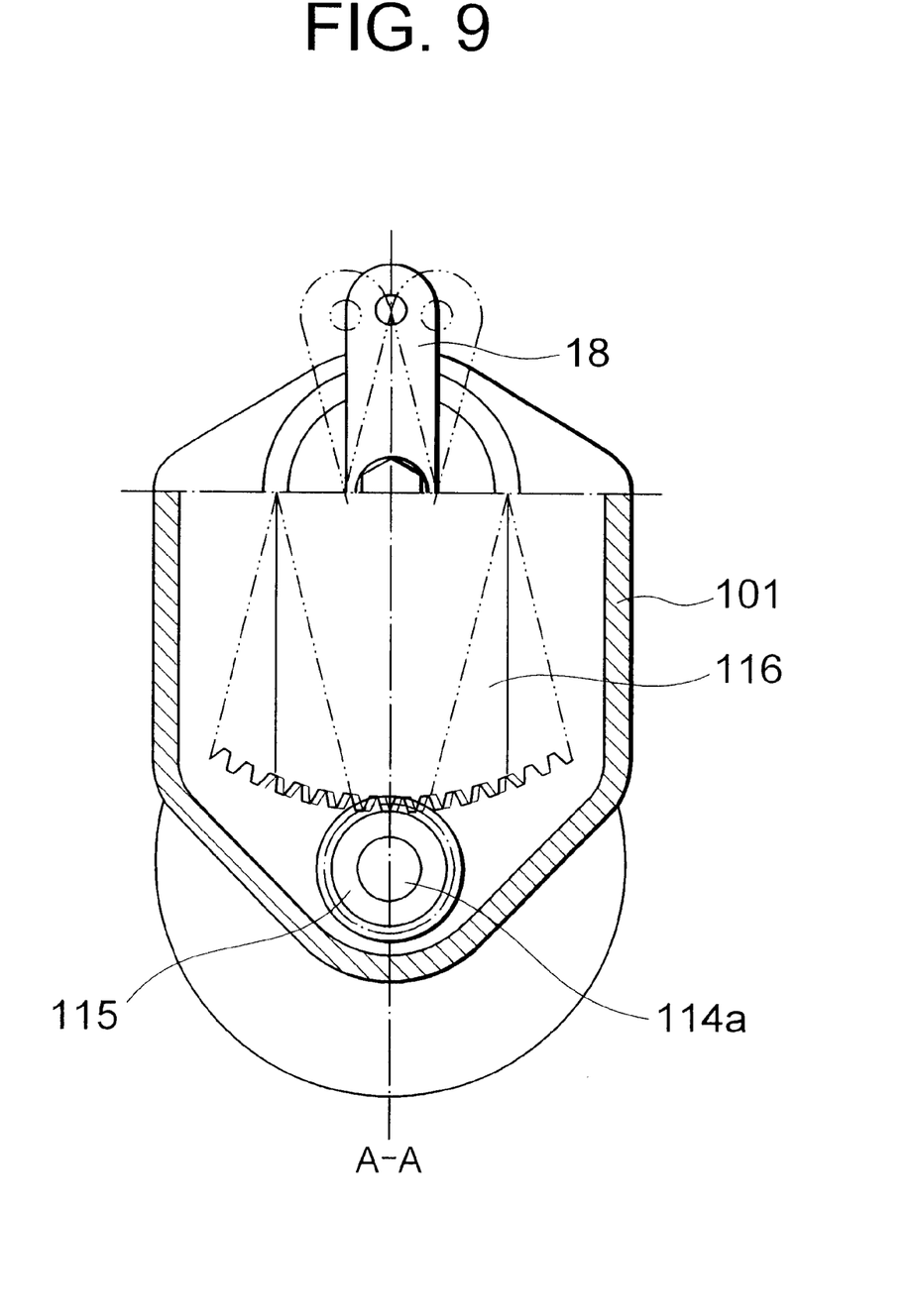
FIG. 9 is a cross-sectional view taken along the line A—A in FIG. 8.

In this modification 113 of the first actuator, in order to allow the shift shaft 2 to rock in a sufficient angular range for a vertical motion thereof, as indicated by the dotted lines in FIG. 9, the sector gear 116 has the teeth in the number corresponding to this operational angular range, and the radius of the pitch circle of the sector gear 116 is suitably selected as three to ten times as large as that of the disk gear 115. In case of this embodiment, the radius is selected as five times. The radius of the pitch circle of the sector gear 116 from the center of rotation of the sector gear 116 to the meshed point with the disk gear 115 is larger than the distance from this center or rotation to the center of operation in the engagement convex portion 119 at the tip end portion of the rocking arm 118, so that a rotation of the sector gear is increased in power and is then transmitted to the rocking arm 118.

The forms of the disk gear 115 and the sector gear 116 are not limited to those in this embodiment. Any rotation transmitting member and any rotation receiving member may be employed so long as they have the shafts substantially in parallel to each other, both in the meaning as described above, are respectively disposed substantially in parallel with the characteristics with respect to the disk gear 115 and the sector gear 116 as described above, and have the peripheral teeth, respectively.

Since the present invention is arranged and operated as described above, it is possible to realize an electric driving device for a transmission which can be reduced in size and weight and can switch the transmission of a small-sized car, such as a passenger car.

What is claimed is:

1. An electric driving device for a transmission which is characterized in that:

a selecting operation for displacing a shift shaft in the axial direction so as to select a desirable gear out of a plurality of gears and a shifting operation for rotating said shift shaft so as to bring the selected gear into a meshing state are performed by a first and second actuators respectively employing electric motors as the driving sources thereof;

the first actuator for performing said selecting operation comprises a first electric motor, a worm gear to be driven to rotate by an output shaft of this first electric motor, a worm wheel to be meshed with this worm gear, and a rocking arm for rotating together with this worm wheel, the tip end of this rocking arm being engaged with a part of said shift shaft to allow this shift shaft to be displaceable in the axial direction upon rocking of this rocking arm;

the second actuator for performing said shifting operation comprises a second electric motor, and a ball screw mechanism equipped with an output shaft member to be driven to rotate by an output shaft of this second electric motor for issuing an output converted into a rectilinear motion; and the tip end of this output shaft member is coupled to the tip end of a driving arm for rotating said shift shaft so that said driving arm is rotated by the rectilinear motion of said output member to rotate said shift shaft, thereby performing said shifting operation.

2. An electric driving device for a transmission according to claim 1, wherein said ball screw mechanism comprises a ball screw shaft to be driven to rotate by said second electric motor, and said output shaft member disposed around this ball screw shaft for moving in the axial direction of the ball screw shaft upon rotation of the ball screw shaft.

3. An electric driving device for a transmission according to claim 1, wherein said ball screw mechanism comprises a ball nut to be driven to rotate by said second electric motor, and a ball screw shaft to be engaged with this ball nut through a ball for moving in the axial direction upon rotation of said ball nut, and said ball screw shaft serves as said output shaft member.

4. An electric driving device for a transmission which is characterized in that:

a selecting operation for displacing a shift shaft in the axial direction so as to select a desirable gear out of a plurality of gears and a shifting operation for rotating said shift shaft so as to bring the selected gear into a meshing state are performed by a first and second actuators respectively employing electric motors as the driving sources thereof;

the first actuator for performing said selecting operation comprises a first electric motor, a rotation transmitting member to be driven to rotate by an output shaft of this first electric motor and having peripheral teeth, a rotation receiving member having peripheral teeth substantially in parallel to the shaft of said rotation transmitting member to be meshed with said peripheral teeth of said rotation transmitting member, and a rocking arm for rotating together with this rotation receiving member, the tip end of this rocking arm being engaged with a part of said shift shaft to allow this shift shaft to be displaceable in the axial direction upon rocking of this rocking arm;

the second actuator for performing said shifting operation comprises a second electric motor, and a ball screw mechanism equipped with an output shaft member to be driven to rotate by an output shaft of this second electric motor for issuing an output converted into a rectilinear motion; and the tip end of this output shaft member is coupled to the tip end of a driving arm for rotating said shift shaft so that said driving arm is rotated by the rectilinear motion of said output member to rotate said shift shaft, thereby performing said shifting operation.

5. An electric driving device for a transmission according to claim 4, wherein said ball screw mechanism comprises a ball screw shaft to be driven to rotate by said second electric motor, and said output shaft member disposed around this ball screw shaft for moving in the axial direction of the ball screw shaft upon rotation of the ball screw shaft.

6. An electric driving device for a transmission according to claim 4, wherein said ball screw mechanism comprises a ball nut to be driven to rotate by said second electric motor, and a ball screw shaft to be engaged with this ball nut through a ball for moving in the axial direction upon rotation of said ball nut, and said ball screw shaft serves as said output shaft member.

7. An electric driving device which is used for a transmission for performing a selecting operation for displacing a shift shaft in the axial direction so as to select a desirable gear to bring it into a meshing state and a shifting operation for rotating said shift shaft so as to bring the selected gear into a meshing state, comprising:

an electric motor;

a ball screw mechanism having an output shaft member for converting a rotation output of said electric motor into a rectilinear motion and outputting this rectilinear motion, said output shaft member arranged to be coupled to a rocking driving arm of said shift shaft to rotate said shift shaft; and a detent mechanism for locating said output shaft member at a neutral position so as to give a predetermined resistance when said output shaft member is moved from said neutral position.

* * * * *